(12) United States Patent
Ishikawa et al.

(10) Patent No.: US 11,630,824 B2
(45) Date of Patent: Apr. 18, 2023

(54) DOCUMENT SEARCH METHOD AND DOCUMENT SEARCH SYSTEM

(71) Applicant: Shimadzu Corporation, Kyoto (JP)

(72) Inventors: Yuki Ishikawa, Kyoto (JP); Kentaro Morimoto, Kyoto (JP); Akiyoshi Otani, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 240 days.

(21) Appl. No.: 17/285,807

(22) PCT Filed: Oct. 16, 2018

(86) PCT No.: PCT/JP2018/038477
§ 371 (c)(1),
(2) Date: Apr. 15, 2021

(87) PCT Pub. No.: WO2020/079752
PCT Pub. Date: Apr. 23, 2020

(65) Prior Publication Data
US 2021/0382881 A1 Dec. 9, 2021

(51) Int. Cl.
*G06F 16/245* (2019.01)
*G06F 16/93* (2019.01)
*G06F 16/248* (2019.01)
*G06F 40/268* (2020.01)
*G06F 40/30* (2020.01)

(52) U.S. Cl.
CPC .......... *G06F 16/245* (2019.01); *G06F 16/248* (2019.01); *G06F 16/93* (2019.01); *G06F 40/268* (2020.01); *G06F 40/30* (2020.01)

(58) Field of Classification Search
CPC ...... G06F 16/245; G06F 16/248; G06F 16/93; G06F 40/268; G06F 40/30

USPC .......................................................... 707/769
See application file for complete search history.

(56) References Cited

U.S. PATENT DOCUMENTS

| 9,235,806 B2 * | 1/2016 | Sweeney ................. G06N 5/02 |
| 2002/0004786 A1 | 1/2002 | Tagawa et al. |
| 2007/0288503 A1 * | 12/2007 | Taylor ................ G06Q 30/0251 |
| | | 707/999.102 |

(Continued)

FOREIGN PATENT DOCUMENTS

| AU | 2004213986 A1 * | 9/2004 | ....... G06F 16/24575 |
| AU | 2008292781 A1 * | 3/2010 | .......... G06F 16/313 |
| CA | 2914398 A1 * | 3/2009 | .......... G06F 16/313 |

(Continued)

OTHER PUBLICATIONS

Decision of Refusal for corresponding Japanese patent application No. JP 2020-553210, dated Sep. 6, 2022.

(Continued)

*Primary Examiner* — Dung K Chau
(74) *Attorney, Agent, or Firm* — Muir Patent Law, PLLC (57) ABSTRACT

Provided are a document search method and a document search system for retrieving a search target semantically relevant to a search keyword. A search processing unit 20 interprets the semantic content of document data relevant to a search query and identifies, based on the interpretation result, a location in the retrieved document data highly semantically relevant to the search query. Then, the document name and the specified location of the retrieved document data are displayed.

14 Claims, 5 Drawing Sheets

(56) References Cited

U.S. PATENT DOCUMENTS

2016/0085853 A1 3/2016 Zelevinsky et al.
2018/0233344 A1 8/2018 Oka et al.

FOREIGN PATENT DOCUMENTS

| JP | 1999045254 | | 2/1999 |
|---|---|---|---|
| JP | 2002083223 | A | 3/2002 |
| JP | 2002257757 | A | 9/2002 |
| JP | 2002259445 | A | 9/2002 |
| JP | 2003115010 | A | 4/2003 |
| JP | 2003173340 | A | 6/2003 |
| JP | 2004295396 | A | 10/2004 |
| JP | 2006146621 | A | 6/2006 |
| JP | 2006331245 | A | 12/2006 |
| JP | 2011103075 | A | 5/2011 |
| JP | 2011175306 | A | 9/2011 |
| JP | 2012059182 | A | 3/2012 |
| JP | 2013020439 | A | 1/2013 |
| JP | 2017004260 | A | 1/2017 |
| JP | 2017528842 | A | 9/2017 |
| JP | 2017201478 | A | 11/2017 |
| JP | 2018010482 | A | 1/2018 |
| JP | 2018132347 | A | 8/2018 |

OTHER PUBLICATIONS

Zhou et al., "Supervised Approaches for Japanese Wikification," 2017, Information Processing Society of Japan.

* cited by examiner

DOCUMENT SEARCH METHOD AND DOCUMENT SEARCH SYSTEM

TECHNICAL FIELD

The present invention relates to a document search method and a document search system for retrieving a search target (document) from a large number of search cases based on an input search query.

BACKGROUND ART

With the development of computer technology and communication networks in recent years, there has been an increasing demand for retrieving desired document data, information, and the like from a database in which a large number of electronic documents, information, and the like have been stored. In the general information search system, by inputting the search term (keyword) that best describes what the searcher wants to search, search processing (matching with the index word) for a database is executed, and document data that matches the specified condition is output as a search result.

Documents include words the same in the meaning but different in the notation (e.g., differences in translation, such as, e.g., "インターフェース" and "インターフェース", differences in okurigana (kana added after a Chinese character to show its Japanese inflection), or similar words (e.g., a calculator, a personal computer, a computer, and the like). In a conventional search method, it was necessary to devise to treat these words (hereinafter referred to as "similar word") as the same. For example, it was attempted to reduce search omissions by replacing search target similar words with all combinations or by associating a plurality of index words with documents. However, there are problems such that, as the number of combinations increases, the retrieval time increases, or the optimum index word cannot be set, so that the necessary retrieval could not always be possible.

For example, Patent Document 1 discloses a document concept search method. In the method, assuming that if a set of pairs is given between a search query and a set of ground truth documents that are search target documents conceptually conforming to the search query, ground truth information may improve the search accuracy, using the ground truth information, retrieving the target documents conceptually conforming to the search query input by the user is performed by improving the search accuracy.

Patent Document 2 discloses a search method. In the method, the importance of a keyword contained in an input sentence expressed in natural language is accurately evaluated. The degree of similarity between an input sentence expressed in natural language and a sentence to be compared is evaluated based on the degree of similarity, etc., between the dependencies between clauses of sentences to be compared. Then, retrieving sentences similar to the input sentence is performed with high accuracy.

Note that, in natural language processing in the field of artificial intelligence, a technique of converting the meaning of a word into a vector expressing the meaning of the word has been used by applying machine learning, not by treating the word itself. For example, a large amount of sentence information is learned by a neural network. A vector space representing the meaning of a word from the distribution of words appearing before and after the word is generated. Then, each word is converted into a vector.

By converting a word into a vector, similar words can be interpreted as having a close distance between the vectors. Therefore, by converting a word contained in a search target, it is not required to combine similar words or set a replacement/index word. When acquiring a vector space of a word by machine learning, the vector representation of the word can be automatically acquired by setting the document data that is a search target to learning data or by setting the document data to learning data by adding a general document available on a web site to the document data.

PRIOR ART DOCUMENT

Patent Document

Patent Document 1: Japanese Unexamined Patent Application Publication No. 2018-10482

Patent Document 2: Japanese Unexamined Patent Application Publication No. 2017-201478

SUMMARY OF THE INVENTION

Problems to be Solved by the Invention

In learning documents, such as, e.g., an analysis report, a technical report, a technical paper, and a research paper, in which technical terms are used a lot, the noun and the verb are divided into morphemes by using an existing dictionary, but technical terms are often not registered in a dictionary. Therefore, there is such a problem that the technical term is recognized as a word different from that originally used, and the proper word vector cannot be acquired as a result of the morphological analysis.

According to a conventional search system as disclosed in Patent Documents 1 and 2, the search system can retrieve documents relevant to a search keyword but does not necessarily retrieve the information that a user wants to know. This is because simply retrieving the patent document associated with the keyword does not necessarily mean that the object information is close to the keyword. Thus, there is a problem that the user needs to find the location in the retrieved document relevant to the search keyword. Further, in some cases, the user cannot understand the contents of the retrieved document.

The present invention has been made in view of the above-described problems. It is an object of the present invention to provide a document search method and a document search system for retrieving not only a search target that matches a search keyword but also a search target semantically relevant to the search keyword.

Means for Solving the Problem

As one means for solving the above-described problems, the present invention relates to a document search method for retrieving document data stored in a database, based on an input search query. The document search method includes the steps of:

retrieving document data highly relevant to the search query from the document data stored in the database;

interpreting a semantic content of the document data relevant to the search query;

specifying a location in the retrieved document data highly semantically relevant to the search query, based on a result of the interpretation; and displaying a document name of the retrieved document data and a specified location.

In the above-described document search method, preferably, searching in the retrieving step and specifying in the specifying step are performed, based on at least one of relevance between a word and a sentence, the word being acquired by dividing the sentence and a document constituting the document data stored in a corpus by a morphological analysis into a plurality of words and vectorizing them by learning, and relevance between the word and a document. Further, preferably, in a case where there exists a plurality of specified locations in the same document data, categorizing the specified locations for each of the plurality of specified locations; and displaying a location relevant to a location belonging to a category of a selected location among the plurality of specified locations. Further, preferably, in a case where there exists a plurality of the specified locations in a plurality of document data, categorizing the specified locations for each of the plurality of the specified locations; and performing extended retrieval on a location relevant to a location belonging to the same category as a category of a location selected from the plurality of locations, from document data other than document data related to the selected location; and displaying the relevant location acquired by the extended retrieval. Further, preferably, the document search method further includes the steps of: generating an abstract of a sentence of the specified location or the relevant location by a predetermined algorithm; and displaying the generated abstract. Further, preferably, the document data includes at least one of an analysis report, an analysis relevant article, an analysis relevant patent document for a predetermined sample, and the specified location includes at least one of abstracts of analysis relevant preprocessing, an analysis relevant device name, an analysis method, an analysis relevant compound name, an analysis relevant analysis target name, the analysis report, the analysis relevant article, and the analysis relevant patent document. Further, preferably, the displaying step displays, as the relevant location, a sentence relevant to at least one of the analysis relevant preprocessing, the analysis relevant device name, the analysis method, the analysis relevant compound name, and the analysis relevant analysis target name included in each of the analysis report, the analysis relevant article, and the analysis relevant patent document. Further, preferably, the displaying step displays the sentence for each paragraph or for each sentence. Further, preferably, the corpus includes document data specialized in a particular field.

Further, as one means for solving the above-described problems, the present invention relates to a document search system for retrieving document data based on a search query. The document search system, includes: a database in which the document data is stored; a retrieval unit configured to retrieve document data highly relevant to the search query from the document data stored in the database; an interpretation unit configured to interpret a semantic content of the document data relevant to the search query; a specification unit configured to specify a location in the retrieved document data highly semantically relevant to the search query, based on a result of the interpretation; and a display unit configured to display a document name of the retrieved document data and a specified location.

Effects of the Invention

According to the present invention, the minimal portion of the retrieved document is displayed as a relevant portion, which makes it easier to understand and grasp the document contents.

EMBODIMENTS FOR CARRYING OUT THE INVENTION

Figure 1:
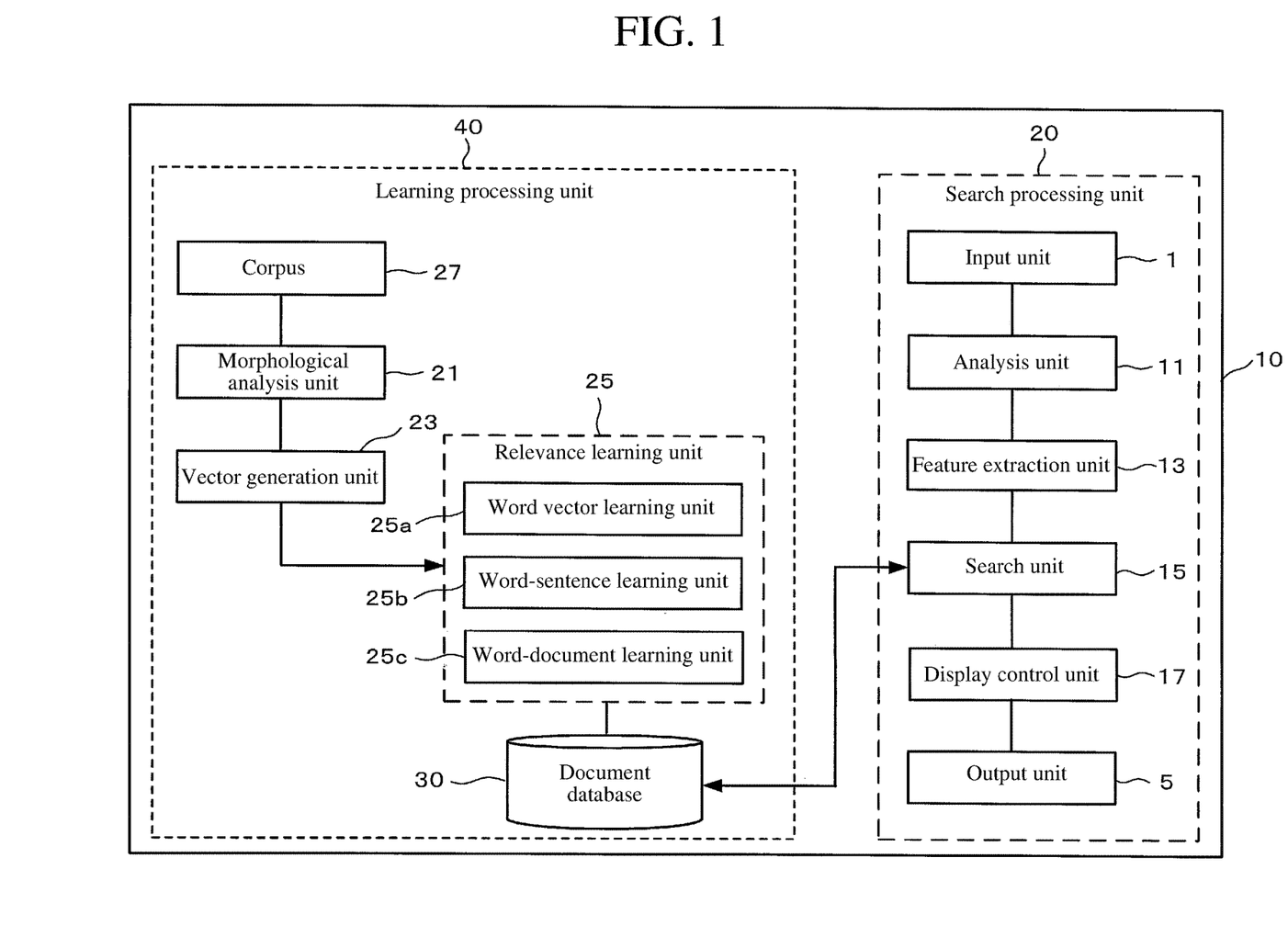
FIG. 1 is a block diagram showing an example of a configuration of a document search system according to an embodiment of the present invention.

Hereinafter, an embodiment according to the present invention will be described in more detail with reference to the attached figures. FIG. 1 is a block diagram showing an exemplary configuration of a document search system according to an embodiment of the present invention. The document search system 10 of FIG. 1 is provided with a search processing unit 20 for executing search processing of, e.g., cases, documents, and the like, and a learning processing unit 40 for retrieving a search case which is a search target.

The document search system 10 retrieve a case, a document, and the like, stored in a search target database (also referred to as a "document database") 30 based on a search query input by a user, etc., who is a searcher, and outputs the search result. The search processing unit 20 is provided with an input unit 1, an analysis unit 11, a feature extraction unit 13, a search unit 15, a display control unit 17, and an output unit 5. The learning processing unit 40 is provided with the document database 30, a morphological analysis unit 21, a vector generation unit 23, a relevance learning unit 25, and a corpus 27.

The search target in the document search system according to this embodiment includes, for example, an analysis report, a analysis relevant article, and an analysis relevant patent document. The analysis report includes, for example, a report of an analysis case and an analysis result, such as, e.g., "Pesticide residues in the sample ΔΔ were analyzed using the device ◯◯". An application news and an application note are also included in the analysis report.

In the search processing unit 20, a search query (also referred to as a "search keyword" or "search string") in which the search target is represented by a character string, a sentence, or the like, is input to the input unit 1 by a user, etc. The search query is composed of a search sentence, a search keyword, a character string indicating the search condition, and the like, and includes an analysis relevant search keyword, an analysis relevant compound name, an analysis relevant analysis target name, and the like, in a case where the search target is an analysis report.

The input unit 1 is configured by, for example, an input device, such as, e.g., a keyboard and a mouse, a display, etc. A search query is input using an input screen on a display. The display also serves as the output unit 5 for displaying the search result, etc.

The analysis unit 11 performs a morphological analysis on the search query input from the input unit 1 based on the predefined search dictionary and divides it into the smallest unit of word. The feature extraction unit 13 calculates a vector (also referred to as "word vector" or a "feature vector") representing the search query. In other words, the feature extraction unit 13 receives the result of the morphological analysis and interprets the meaning of the search query corresponding to the relation with the search target from the syntax of the search query and the like.

The search unit 15 searches document data, such as, e.g., an analysis report, based on the word vector of the search keyword acquired by the feature extraction unit 13. Here, vectorized and featured document data or the like as described later is retrieved as the search target. For example, the degree of similarity between the search query represented by the feature vector and the document data, etc., is calculated, and the presence or absence of the document data indicated by the search query is determined based on the degree of coincidence or the degree of similarity.

That is, the search unit 15 extracts the document data or the like that matches or is similar to the semantic content of the search query by referring to the document database 30 and outputs it to the display control unit 17. The output unit 5 displays the information corresponding to the control result of the display control unit 17. As a result, the user, etc., can acquire a desired case, document, or the like, as the document data or the like.

Next, the learning processing unit 40 constituting the document search system 10 of this embodiment will be described. In FIG. 1, the morphological analysis unit 21 of the learning processing unit 40 divides all documents (document data) stored in the corpus 27 into words by a morphological analysis and subdivides the document data. The vector generation unit 23 receives the result of the morphological analysis and constructs a word vector which is a semantic representation of a word. The vector generation unit 23 further generates a sentence vector representing the characteristics of a sentence and a document vector which is a feature vector of a document from the sum of feature quantities of words contained in the document. Note that the document data may be subdivided in paragraph unit.

The word vector, the sentence vector, and the document vector generated by the vector generation unit 23 are transmitted to the relevance learning unit 25. As shown in FIG. 1, the relevance learning unit 25 is configured by a word vector learning unit 25a, a word-sentence learning unit 25b, and a word-document learning unit 25c.

The word vector learning unit 25a computes the semantic relation between words in the vector space and the vector distance between words since the distance between vectors in the vector space of words represents the degree of semantic similarity between words. Similarly, the word-sentence learning unit 25b computes the relevance between a word and a sentence and the vector distance in the vector space. The word-document learning unit 25c computes the relevance space and the vector distance between a word and a sentence in the vector.

The calculation results in the word vector learning unit 25a, the word-sentence learning unit 25b, and the word-document learning unit 25c are stored as the word vector, the word-sentence vector, and the word-document vector together with the learning data, in the document database 30 having a multi-dimensional vector space with each of the word, the sentence, and the document as a coordinate axis.

In the corpus 27, by accumulating data centering on, for example, documents and technical terms in a specific field, a search target vector that matches the field can be obtained, the search accuracy of the sentence and the like in the specific field can be improved, and the retrieval speed can be increased.

The corpus may be configured by an internal corpus storing internal reports, technical newsletters, application news, and the like, and an external corpus collecting data and the like disclosed to the outside on a Website, such as, e.g., Wikipedia (registered mark).

Figure 2:
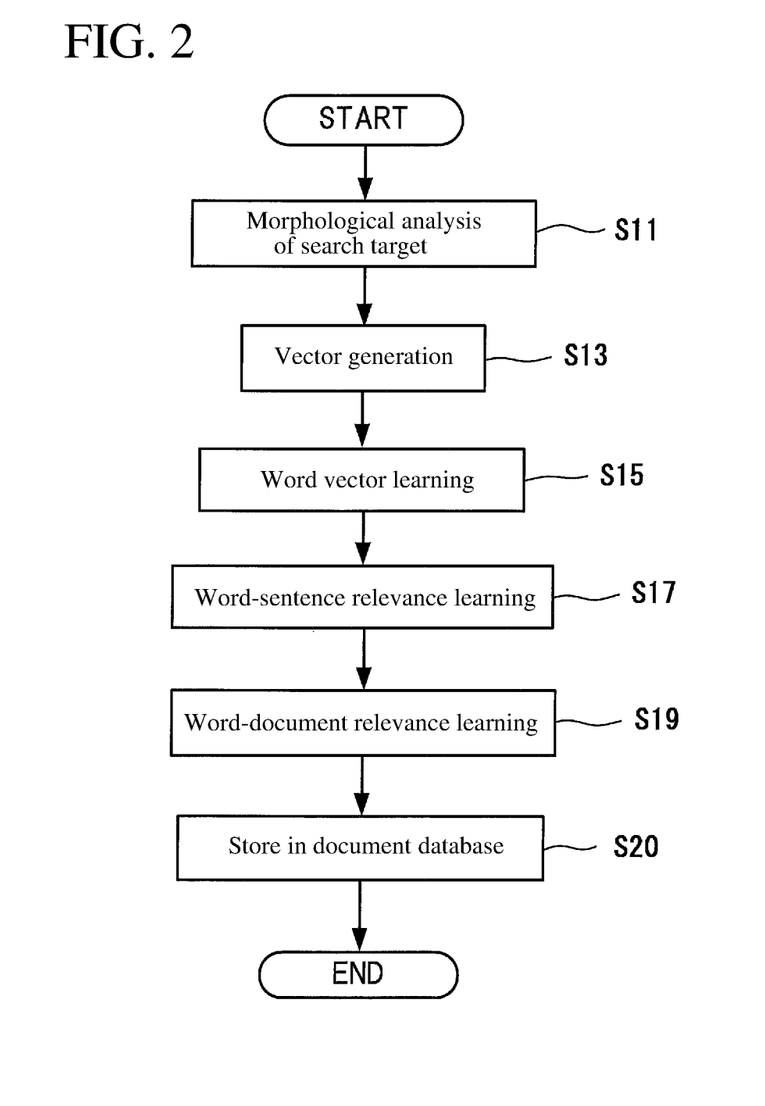
FIG. 2 is a flowchart showing steps of learning a search target in the document search system.
Figure 3:
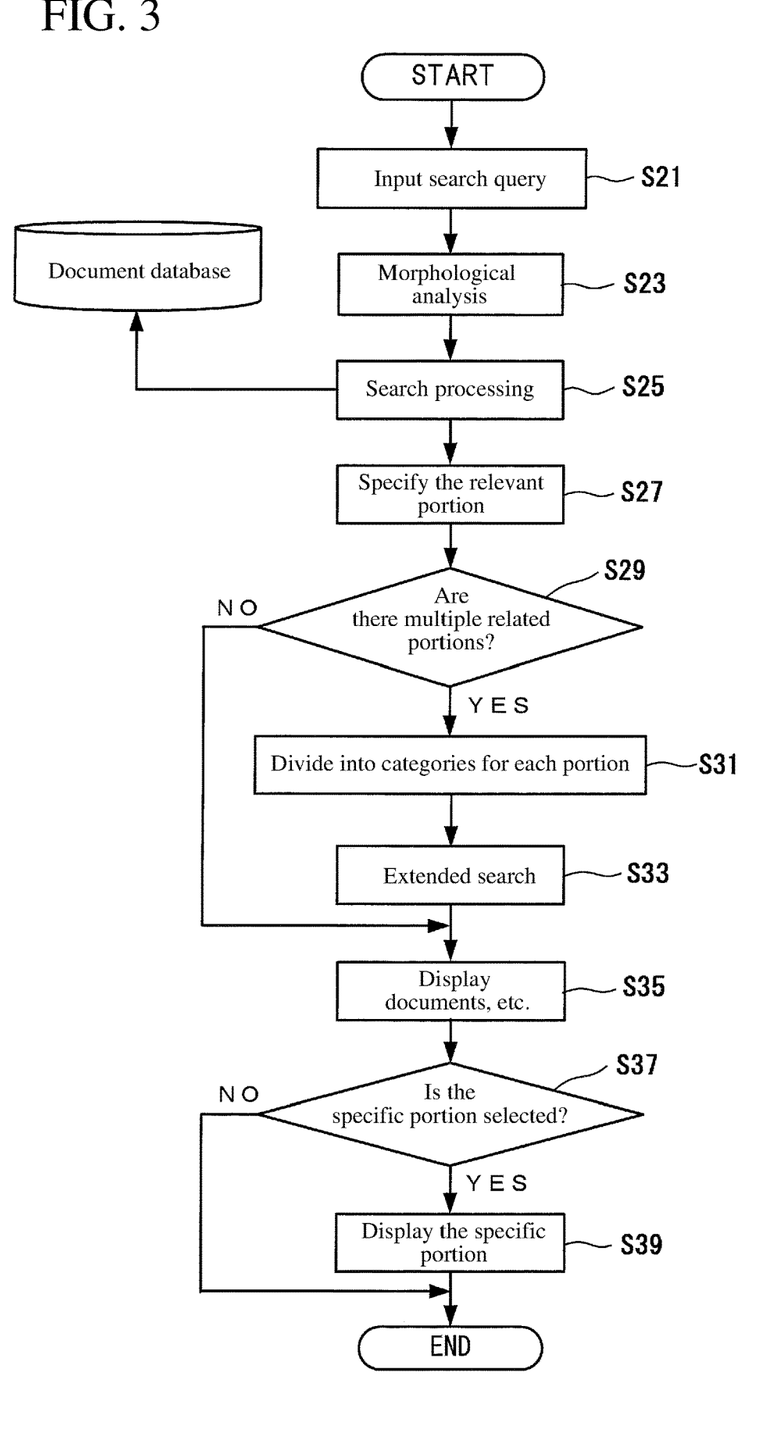
FIG. 3 is a flowchart showing search processing steps for retrieving a search target in the document search system.

Next, the search processing steps in the document search system of this embodiment will be described. FIG. 2 is a flowchart showing the retrieval target learning steps. FIG. 3 is a flowchart showing the retrieval processing steps for a search target.

In Step S11 of FIG. 2, the search target (document data, etc.) stored in the corpus 27 is divided into a plurality of words (morphemes) by a morphological analysis using an existing dictionary. In the subsequent Step S13, based on the result of the morphological analysis in Step S11, a word vector which is a semantic expression of the word is constructed, and a document vector representing a feature vector of the document is generated from a sentence vector representing the features of the sentence, a sum of feature quantities of the words included in the document, and the like.

Here, a sentence is the smallest unit of a meaningful sentence, and a document is composed of a plurality of sentences. A sentence in Japanese is separated by punctuation, and a sentence in English or other languages is separated by a period. Therefore, a document is divided into sentences with punctuation or a period for each sentence by the above-described morphological analysis, and a sentence vector is generated based on the analysis of the dependency of the sentences. The document may be divided into paragraphs to generate a sentence vector in the paragraph unit.

Since the distance between the vectors in the vector space of words represents the semantic similarity between the words, in Step S15, the semantic relevance between the words and the vector distance between the words in the vector space are calculated by, for example, word2bec. In the subsequent Step S17, the relevance between the word and the sentence and the vector distance in the vector space are calculated. In the subsequent Step S19, the relevance between the word and the document and the vector distance in the vector space are calculated.

In Step S20, together with the learning data of the search target, the results of the calculations in the above-described Steps S15, S17, and S19 are stored in the document database 30 as the word vector, the word-sentence vector, and the word-document vector.

Next, the search processing for retrieving a case that the user needs using the document search system of this embodiment will be described. First, in Step S21 of FIG. 3, a search query (search keyword) is input by the user, etc. In the following Step S23, a morphological analysis splits the search query into smallest unit morphemes (word vectors).

In Step S25, search processing is performed by referring to a document database in which learning data or the like vectorized by learning of a search target in advance is accumulated. This search processing retrieves a document (literature) relevant to or highly relevant to a search query (search keyword) as a search result. The document (literature) highly relevant to an input search query is a document (literature) high in the relevance between a word and a document in a vector space and close in the vector distance, which is obtained by calculating the relevance between a word and a document in advance.

In Step S27, a location (e.g., a sentence, a phrase, etc.) semantically highly relevant to the search query in a document retrieved in Step S25 is specified. In this case, a sentence high in the relevance between the word and the sentence in the vector space and having a close vector distance, which is obtained in advance by calculation, is specified.

The above-described highly relevant location includes, for example, preprocessing, an analysis device name, an analysis method, an organic solvent, a summary column in a document (literature), and the like in a case where a document (literature) is an analysis report and relates to the field of a compound analysis. Particularly, in a compound analysis, it is important that the analysis is performed after what preprocessing was performed. Therefore, the descriptive portion relevant to the preprocessing is included as the highly relevant location.

In Step S29, it is determined whether or not there is a plurality of specified relevant locations. In a case where there is a plurality of related locations, in Step S31, the plurality of locations is divided into categories for each location. The categories include, for example, preprocessing and an analysis device parameter.

In Step S33, extended retrieval is performed to determine whether or not the location related to the specified relevant location is also present in another document. For example, in a case where a document (literature) relevant to preprocessing of an analysis of a certain compound is specified, the above-described extended retrieval is processing for retrieving a relevant location in another document (literature), considering that preprocessing relating to a compound different from the above-described compound, or a preprocessing relating to an analysis of similar compounds is effective information (reference example) for a user, etc.

Note that in a case where the specified related location exists over a plurality of documents, it may be configured to determine whether or not the location belonging to the category of the related location selected by the user, etc., exists in another document (literature), as the above-described extended retrieval.

In Step S35, the document name and the related sentence in the document retrieved by the above-described search processing are displayed on a display, and the relevant location within the related sentence, such as, e.g., the above-described preprocessing and the analysis device name, is highlighted and displayed. For the related sentence in the document (literature), the entire sentence or a part of the sentence may be displayed in accordance with the selection by the user, etc.

In Step S37, it is determined whether or not the particular portion of the sentence displayed in Step S35 is selected by operating the input device, such as, e.g., a keyboard and a mouse, by the user, etc. The specified portion, for example, a portion in which a tag, etc., is added in advance and categorized in the sentence. In a case where the portion selected by the user, etc., is a portion related to, for example, the preprocessing to which a tag, etc., is attached, the preprocessing portion is displayed in Step S39.

Figure 4:
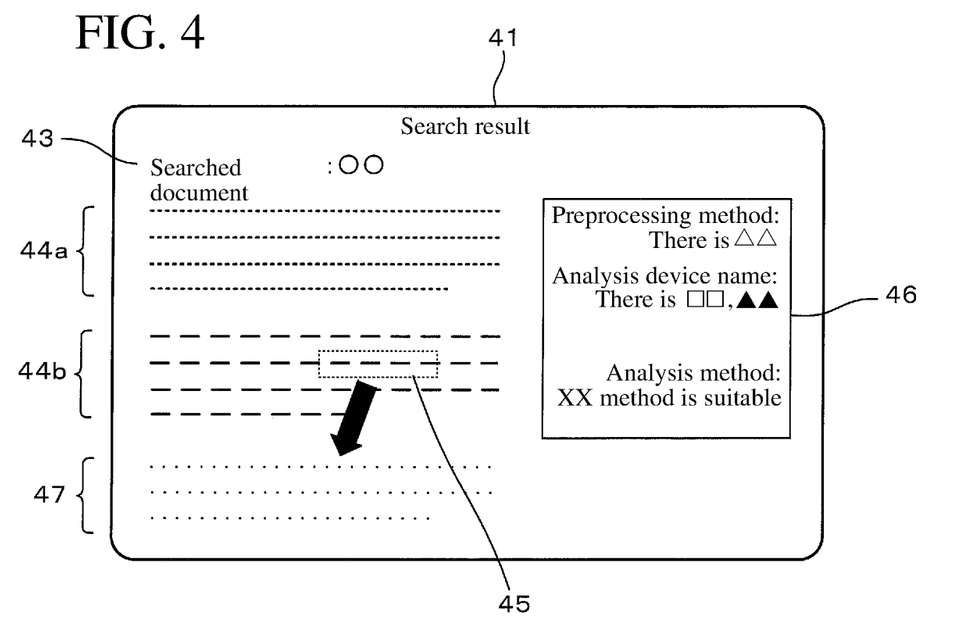
FIG. 4 shows a display example of a search processing result in the document search system.

FIG. 4 is a display example of the search processing result. In the case of FIG. 4, the retrieved document name (reference name) 43 is displayed on the upper side of the display 41, and the location (sentence) semantically highly relevant to the search query in the retrieved document is displayed as sub-information on the lower side. FIG. 4 shows a display example when there are two relevant locations 44a and 44b in the document.

For example, when "preprocessing" is input as a search query, it is determined from the feature (meaning) of the search query that the user, etc., wants to know the preprocessing of the analysis, and the location (sentence) in which the preprocessing method is described in the document is displayed as the relevant location.

Further, in the example shown in FIG. 4, in order to improve the visibility, the preprocessing, the analysis device name, and the like are collectively displayed in the table 46. Further, when a specific portion 45 in the sentence is selected by the user, etc., the detailed content 47 relating to the specific portion 45 is displayed as a portion categorized by adding the tags, etc., at the lower portion of the related location.

It should be noted that for example, another preprocessing generated by expanding the content of the preprocessing as a related location may be displayed as a reference example by the above-described extended retrieval. Further, with respect to the relevant locations 44a and 44b provided as the sub-information, a sentence in which the location is summarized may be generated by a predetermined algorithm and displayed in the form of an abstract. As a result, the user, etc., can quickly and easily grasp and understand the relevant location.

Further, in the relevant locations 44a and 44b, the sentence relating to, for example, the preprocessing may be highlighted.

Figure 5:
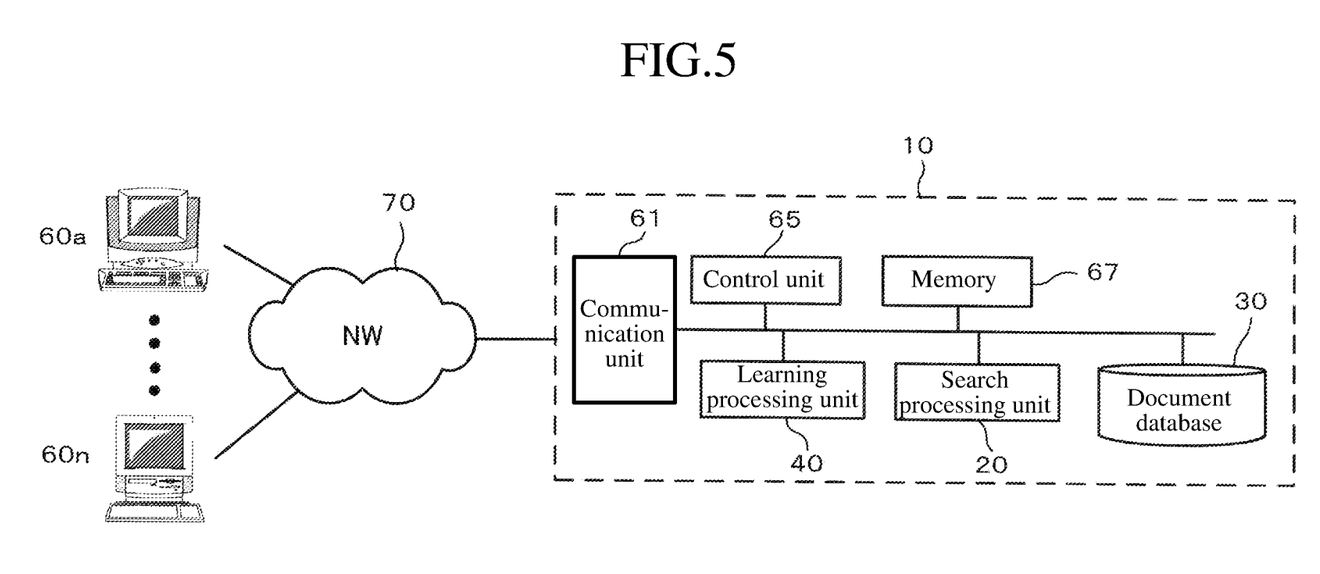
FIG. 5 is a diagram showing a configuration example in which a document search system is connected via a network.

FIG. 5 shows a configuration example in which the document search system of this embodiment is connected via a network (public network). As shown in FIG. 5, the document search system 10 according to this embodiment enables the retrieval of a case in response to a request from a user, etc., in an Internet environment, and provides the search result to the user, etc.

Therefore, the document search system 10 and a plurality of user terminals 60a . . . 60n are communicably connected via the information and communication network 70, such as, e.g., the Internet. The communication unit 61 in the document search system 10 is an interface with the network 70. The control unit 65 is composed of, for example, a microprocessor or the like, which entirely controls the document search system 10 including the search processing unit 20 and the learning processing unit 40.

The memory 67 stores a search processing program of the search target in the search processing unit 20, the learning processing program, etc., in the learning processing unit 40. The control unit 65 reads out these programs and executes the predetermined processing, etc., shown in FIG. 2 and FIG. 3. Note that the entire document search system 10 can be considered as a server device connected to the network 70.

As described above, according to this embodiment, by providing, as sub-information, a location highly semantically relevant to the search query in the retrieved document, the user, etc., does not need to search the related location in the document. That is, the user, etc., can easily grasp the relevant location. Thus, since it is enough for the user to understand only the provided minimal location, rather than the entire retrieved document, it is possible to easily grasp the relevant portion, which improves the usability in the search system and the search method.

Further, by categorizing the relevant locations in the document, for example, by dividing them into the preprocessing description locations, the device parameter description location, and the like, the selection by the user and the retrieval of the related parameter group can be performed.

DESCRIPTION OF SYMBOLS

1: Input unit
5: Output unit

10: Document search system
11: Analysis unit
13: Feature extraction unit
15: Search unit
17: Display control unit
20: Search processing unit
21: Morphological analysis unit
23: Vector generation unit
25: Relevance learning unit
25a: Word vector learning unit
25b: Word-sentence learning unit
25c: Word-document learning unit
27: Corpus
30: Search target database
40: Learning processing unit
41: Display
44a, 44b: Relevant location
60a . . . 60n: User terminal
65: Control unit
67: Memory
70: Network

The invention claimed is:

1. A document search method for retrieving document data stored in a database, based on an input search query, comprising the steps of:
   retrieving document data highly relevant to the search query from the document data stored in the database;
   interpreting a semantic content of the document data relevant to the search query;
   specifying a location in the retrieved document data highly semantically relevant to the search query as a relevant location, based on a result of the interpretation;
   presenting the relevant location to make a user select a part of the relevant location as a specific location, and
   displaying a document name of the retrieved document data, the specified relevant location, and information relevant to the selected specific location.

2. The document search method as recited in claim 1, wherein searching in the searching step and specifying in the specifying step are performed, based on at least one of relevance between a word and a sentence, the word being acquired by dividing the sentence and a document constituting the document data stored in a corpus by a morphological analysis into a plurality of words and vectorizing them by learning, and relevance between the word and a document.

3. The document search method as recited in claim 2, wherein the corpus includes document data specialized in a particular field.

4. The document search method as recited in claim 1, further comprising the steps of:
   generating an abstract of a sentence of the specified location or the relevant location by a predetermined algorithm; and
   displaying the generated abstract.

5. The document search method according to claim 1, wherein the document data includes at least one of an analysis report, an analysis relevant article, and an analysis relevant patent document for a predetermined sample, and the specified location includes at least one of abstracts of analysis relevant preprocessing, an analysis relevant device name, an analysis method, an analysis relevant compound name, an analysis relevant analysis target name, the analysis report, the analysis relevant article, and the analysis relevant patent document.

6. The document search method as described in claim 5, wherein the displaying step displays, as the relevant location, a sentence relevant to at least one of the analysis relevant preprocessing, the analysis relevant device name, the analysis method, the analysis relevant compound name, and the analysis relevant analysis target name included in each of the analysis report, the analysis relevant article, and the analysis relevant patent document.

7. The document search method as recited in claim 6, wherein the displaying step displays the sentence for each paragraph or for each sentence.

8. A document search method for retrieving document data stored in a database, based on an input search query, comprising the steps of:
   retrieving document data highly relevant to the search query from the document data stored in the database;
   interpreting a semantic content of the document data relevant to the search query;
   specifying a location in the retrieved document data highly semantically relevant to the search query, based on a result of the interpretation;
   displaying a document name of the retrieved document data and the specified location;
   in a case where there exists a plurality of specified locations in the same document data, categorizing the specified locations for each of the plurality of specified locations; and
   displaying a location relevant to a location belonging to a category of a selected location among the plurality of specified locations.

9. The document search method as recited in claim 8, further comprising the steps of:
   generating an abstract of a sentence of the specified location or the relevant location by a predetermined algorithm; and
   displaying the generated abstract.

10. The document search method according to claim 8, wherein the document data includes at least one of an analysis report, an analysis relevant article, and an analysis relevant patent document for a predetermined sample, and the specified location includes at least one of abstracts of analysis relevant preprocessing, an analysis relevant device name, an analysis method, an analysis relevant compound name, an analysis relevant analysis target name, the analysis report, the analysis relevant article, and the analysis relevant patent document.

11. A document search method for retrieving document data stored in a database, based on an input search query, comprising the steps of:
   retrieving document data highly relevant to the search query from the document data stored in the database;
   interpreting a semantic content of the document data relevant to the search query;
   specifying a location in the retrieved document data highly semantically relevant to the search query, based on a result of the interpretation;
   displaying a document name of the retrieved document data and the specified location;
   in a case where there exists a plurality of the specified locations in a plurality of document data, categorizing the specified locations for each of the plurality of the specified locations;
   performing extended retrieval on a location relevant to a location belonging to the same category as a category of a location selected from the plurality of locations, from document data other than document data related to the selected location; and displaying the relevant location acquired by the extended retrieval.

12. The document search method as recited in claim 11, further comprising the steps of:

generating an abstract of a sentence of the specified location or the relevant location by a predetermined algorithm; and displaying the generated abstract.

13. The document search method according to claim 11, wherein the document data includes at least one of an analysis report, an analysis relevant article, and an analysis relevant patent document for a predetermined sample, and the specified location includes at least one of abstracts of analysis relevant preprocessing, an analysis relevant device name, an analysis method, an analysis relevant compound name, an analysis relevant analysis target name, the analysis report, the analysis relevant article, and the analysis relevant patent document.

14. A document search system for retrieving document data based on a search query, comprising:

a database in which the document data is stored, a retrieval unit configured to retrieve document data highly relevant to the search query from the document data stored in the database;

an interpretation unit configured to interpret a semantic content of the document data relevant to the search query;

a specification unit configured to specify a location in the retrieved document data highly semantically relevant to the search query as a relevant location, based on a result of the interpretation;

a selection unit configured to present the relevant location to make a user select a part of the relevant location as a specified location; and a display unit configured to display a document name of the retrieved document data, the specified relevant location, and information relevant to the selected specified location.

\* \* \* \* \*